United States Patent
Dernoncourt et al.

(10) Patent No.: US 12,412,038 B2
(45) Date of Patent: Sep. 9, 2025

(54) TRAINING LANGUAGE MODELS AND PRESERVING PRIVACY

(71) Applicant: Adobe Inc., San Jose, CA (US)

(72) Inventors: Franck Dernoncourt, Spokane, WA (US); Tong Sun, San Ramon, CA (US); Thi Kim Phung Lai, San Jose, CA (US); Rajiv Bhawanji Jain, Falls Church, VA (US); Nikolaos Barmpalios, Sunnyvale, CA (US); Jiuxiang Gu, Baltimore, MD (US)

(73) Assignee: Adobe Inc., San Jose, CA (US)

( * ) Notice: Subject to any disclaimer, the term of this patent is extended or adjusted under 35 U.S.C. 154(b) by 259 days.

(21) Appl. No.: 18/173,199

(22) Filed: Feb. 23, 2023

(65) Prior Publication Data

US 2024/0135103 A1    Apr. 25, 2024

Related U.S. Application Data

(60) Provisional application No. 63/413,519, filed on Oct. 5, 2022.

(51) Int. Cl.
*G06F 40/295* (2020.01)
*G06F 40/274* (2020.01)

(52) U.S. Cl.
CPC .......... *G06F 40/295* (2020.01); *G06F 40/274* (2020.01)

(58) Field of Classification Search
None
See application file for complete search history.

(56) References Cited

U.S. PATENT DOCUMENTS

| | | | |
|---|---|---|---|
| 8,359,472 B1 * | 1/2013 | Ren | G06F 16/325 |
| | | | 713/176 |
| 10,614,345 B1 * | 4/2020 | Tecuci | G06N 3/08 |
| 11,144,669 B1 * | 10/2021 | Rao | G06N 7/01 |
| 11,188,719 B1 * | 11/2021 | Anand | G06N 3/044 |
| 11,347,803 B2 * | 5/2022 | Prabhugaonkar | |
| | | | G06F 16/90332 |

(Continued)

OTHER PUBLICATIONS

Abadi, Martin, et al., "Deep learning with differential privacy", Cornell University arXiv, arXiv.org [retrieved Dec. 12, 2022]. Retrieved from the Internet <https://arxiv.org/pdf/1607.00133.pdf%20>., Oct. 24, 2016, 14 Pages.

(Continued)

*Primary Examiner* — Quynh H Nguyen
(74) *Attorney, Agent, or Firm* — FIG. 1 Patents

(57) ABSTRACT

In implementations of systems for training language models and preserving privacy, a computing device implements a privacy system to predict a next word after a last word in a sequence of words by processing input data using a machine learning model trained on training data to predict next words after last words in sequences of words. The training data describes a corpus of text associated with clients and including sensitive samples and non-sensitive samples. The machine learning model is trained by sampling a client of the clients and using a subset of the sensitive samples associated with the client and a subset of the non-sensitive samples associated with the client to update parameters of the machine learning model. The privacy system generates an indication of the next word after the last word in the sequence of words for display in a user interface.

19 Claims, 15 Drawing Sheets

(56) References Cited

U.S. PATENT DOCUMENTS

| | | | |
|---|---|---|---|
| 2017/0032257 A1* | 2/2017 | Sharifi | G06F 16/36 |
| 2021/0019442 A1* | 1/2021 | Patel | G06F 21/606 |
| 2021/0019667 A1* | 1/2021 | Hudson | G06Q 10/0633 |
| 2021/0326537 A1* | 10/2021 | Liu | G06F 21/6245 |
| 2024/0185842 A1* | 6/2024 | Assael | G10L 15/16 |

OTHER PUBLICATIONS

Arachchige, P.C.M., et al., "Local Differential Privacy for Deep Learning", Cornell University arXiv, arXiv.org [retrieved Dec. 12, 2022]. Retrieved from the Internet <https://arxiv.org/pdf/1908.02997.pdf>., Nov. 9, 2019, 16 Pages.

Asi, Hilal, et al., "Element Level Differential Privacy: The Right Granularity of Privacy", Cornell University arXiv, arXiv.org [retrieved Dec. 12, 2022]. Retrieved from the Internet <https://arxiv.org/pdf/1912.04042.pdf>., Dec. 5, 2019, 34 Pages.

Badawi, Ahmad AL, et al., "PrivFT: Private and Fast Text Classification with Homomorphic Encryption", Cornell University arXiv, arXiv.org [retrieved Dec. 11, 2022]. Retrieved from the Internet <https://arxiv.org/pdf/1908.06972.pdf>., Nov. 18, 2019, 16 Pages.

Brown, Tom, et al., "Language Models are Few-Shot Learners", Advances in Neural Information Processing Systems [retrieved Mar. 27, 2023]. Retrieved from the Internet <https://armatech.us/OpenLanding/Language%20Models%20are%20Few-Shot%20Learners.pdf>., Jul. 22, 2020, 25 Pages.

Carlini, Nicholas, et al., "Extracting training data from large language models", Cornell University arXiv, arXiv.org [retrieved Dec. 11, 2022]. Retrieved from the Internet <https://arxiv.org/pdf/2012.07805.pdf>., Jun. 15, 2021, 19 Pages.

Carlini, Nicholas, et al., "The secret sharer: Evaluating and 370 testing unintended memorization in neural networks", Cornell University arXiv, arXiv.org [retrieved Dec. 11, 2022]. Retrieved from the Internet <https://arxiv.org/pdf/1802.08232.pdf>., Jul. 16, 2019, 19 Pages.

Derczynski, Leon, et al., "Results of the WNUT2017 Shared Task on Novel and Emerging Entity Recognition", Proceedings of the 3rd Workshop on Noisy User-generated Text [retrieved Dec. 12, 2022]. Retrieved from the Internet <https://aclanthology.org/W17-4418.pdf>., Sep. 2018, 8 Pages.

Dernoncourt, Franck, et al., "De-identification of Patient Notes with Recurrent Neural Networks", Cornell University arXiv, arXiv.org [retrieved Dec. 12, 2022]. Retrieved from the Internet <https://arxiv.org/pdf/1606.03475.pdf>., Jun. 10, 2016, 13 Pages.

Devlin, Jacob, et al., "BERT: Pre-Training of Deep Bidirectional Transformers for Language Understanding", Cornell University, arXiv Preprint, arXiv.org [retrieved on Dec. 12, 2022]. Retrieved from the Internet <https://arxiv.org/pdf/1810.04805.pdf>., May 24, 2019, 16 pages.

Duchi, John, et al., "Minimax optimal procedures for locally private estimation", Cornell University arXiv, arXiv.org [retrieved Dec. 12, 2022]. Retrieved from the Internet <https://arxiv.org/pdf/1604.02390.pdf>., Nov. 14, 2017, 64 Pages.

Dwork, Cynthia, et al., "Calibrating Noise to Sensitivity in Private Data Analysis", Theory Of Cryptography, Proceedings, vol. 3876 [retrieved Dec. 12, 2022]. Retrieved from the Internet <https://www.microsoft.com/en-us/research/wp-content/uploads/2006/03/dmns06.pdf>., Mar. 2006, 20 Pages.

Dwork, Cynthia, "Differential privacy: A survey of results", Lecture Notes in Computer Science book series (LNTCS, vol. 4052)<https://personal.utdallas.edu/~muratk/courses/crypto-for-dbsec10s_files/differential-privacy-survey.pdf>., Apr. 25, 2008, 19 Pages.

Dwork, Cynthia, et al., "The Algorithmic Foundations of Differential Privacy", [retrieved Dec. 11, 2022]. Retrieved from the Internet <https://maxkasy.github.io/home/files/other/ML_Econ_Oxford/differential_privacy.pdf>., Aug. 11, 2014, 281 Pages.

Erlingsson, Úlfar, et al., "Rappor: Randomized aggregatable privacy-preserving ordinal response", CCS '14: Proceedings of the 2014 ACM SIGSAC Conference on Computer and Communications Security [retrieved Dec. 12, 2022]. Retrieved from the Internet <http://static.googleusercontent.com/media/research.google.com/en//pubs/archive/42852.pdf>., Nov. 3, 2014, 14 Pages.

Hard, Andrew, et al., "Federated Learning for Mobile Keyboard Prediction", Cornell University arXiv, arXiv.org [retrieved Dec. 12, 2022]. Retrieved from the Internet <https://arxiv.org/pdf/1811.03604.pdf>., Feb. 28, 2019, 7 Pages.

Kairouz, Peter, et al., "Advances and Open Problems in Federated Learning", Foundations and Trends in Machine Learning, vol. 14, No. 1 [retrieved Dec. 12, 2022]. Retrieved from the Internet <https://par.nsf.gov/servlets/purl/10250384>., Mar. 9, 2021, 121 Pages.

Liu, Ruixuan, et al., "FedSel: Federated SGD under Local Differential Privacy with Top-k Dimension Selection", Cornell University arXiv, arXiv.org [retrieved Dec. 12, 2022]. Retrieved from the Internet <https://arxiv.org/pdf/2003.10637.pdf>., Mar. 24, 2020, 18 Pages.

Lyu, Lingjuan, et al., "Differentially Private Representation for NLP: Formal Guarantee and An Empirical Study on Privacy and Fairness", Cornell University arXiv, arXiv.org [retrieved Dec. 12, 2022]. Retrieved from the Internet <https://arxiv.org/pdf/2010.01285.pdf>., Oct. 3, 2020, 11 Pages.

Lyu, Lingjuan, et al., "Towards differentially private text representations", Cornell University arXiv, arXiv.org [retrieved Dec. 12, 2022]. Retrieved from the Internet <https://arxiv.org/pdf/2006.14170.pdf>., Jun. 25, 2020, 4 Pages.

Mcmahan, H Brendan, et al., "Communication-Efficient Learning of Deep Networks from Decentralized Data", Cornell University arXiv, arXiv.org [retrieved Dec. 12, 2022]. Retrieved from the Internet <https://arxiv.org/pdf/1602.05629.pdf>., Feb. 28, 2017, 11 pages.

Mcmahan, H.B., "Federated Learning of Deep Networks using Model Averaging", Cornell University arXiv, arXiv.org [retrieved Dec. 12, 2022]. Retrieved from the Internet <https://arxiv.org/pdf/1602.05629v1.pdf>., Feb. 17, 2016, 11 Pages.

Mcmahan, H. Brendan, et al., "Learning Differentially Private Recurrent Language Models", Cornell University arXiv, arXiv.org [retrieved Dec. 12, 2022]. Retrieved from the Internet <https://arxiv.org/pdf/1710.06963.pdf>., Feb. 24, 2018, 14 Pages.

Merity, Stephen, et al., "Regularizing and optimizing LSTM language models", Cornell University arXiv, arXiv.org [retrieved Dec. 12, 2022]. Retrieved from the Internet <https://arxiv.org/pdf/1708.02182.pdf>., Aug. 7, 2017, 10 Pages.

Qi, Peng, et al., "Stanza : A Python Natural Language Processing Toolkit for Many Human Languages", Cornell University arXiv, arXiv.org [retrieved Dec. 12, 2022]. Retrieved from the Internet <https://arxiv.org/pdf/2003.07082.pdf>., Apr. 23, 2020, 8 Pages.

Radford, Alec, et al., "Improving Language Understanding by Generative Pre-Training", Computer Science [retrieved Dec. 11, 2022]. Retrieved from the Internet <https://www.cs.ubc.ca/~amuham01/LING530/papers/radford2018improving.pdf>., Aug. 2018, 12 pages.

Radford, Alec, et al., "Language Models are Unsupervised Multitask Learners", OpenAI blog, vol. 1, No. 8 [retrieved Dec. 11, 2022]. Retrieved from the Internet <https://life-extension.github.io/2020/05/27/GPT%E6%8A%80%E6%9C%AF%E5%88%9D%E6%8E%A2/language-models.pdf>., Mar. 2019, 24 pages.

Ramaswamy, Swaroop, et al., "Training Production Language Models without Memorizing User Data", Cornell University arXiv, arXiv.org [retrieved Dec. 12, 2022]. Retrieved from the Internet <https://arxiv.org/pdf/2009.10031.pdf>., Sep. 21, 2020, 11 Pages.

Roth, Aaron, "Buying private data at auction: the sensitive surveyor's problem", ACM SIGecom Exchanges, vol. 11, No. 1 [retrieved Dec. 12, 2022]. Retrieved from the Internet <https://www.sigecom.org/exchanges/volume_11/1/ROTH.pdf>., Jun. 1, 2012, 6 Pages.

Salem, Ahmed, et al., "ML-Leaks: Model and Data Independent Membership Inference Attacks and Defenses on Machine Learning Models", Cornell University arXiv, arXiv.org [retrieved Dec. 12, 2022]. Retrieved from the Internet <https://arxiv.org/pdf/1806.01246.pdf>., Dec. 14, 2018, 15 Pages.

Shokri, Reza, et al., "Membership Inference Attacks Against Machine Learning Models", Cornell University arXiv, arXiv.org [retrieved Dec. 12, 2022]. Retrieved from the Internet <https://arxiv.org/pdf/1610.05820.pdf>., Mar. 31, 2017, 16 Pages.

(56) References Cited

OTHER PUBLICATIONS

Tjong, Erik, et al., "Introduction to the CoNLL-2003 Shared Task: Language-Independent Named Entity Recognition", Cornell University arXiv, arXiv.org [retrieved Dec. 12, 2022]. Retrieved from the Internet <https://arxiv.org/pdf/cs/0306050.pdf>., Jun. 12, 2003, 6 Pages.

Wagh, Sameer, et al., "DP-Cryptography: Marrying Differential Privacy and Cryptography in Emerging Applications", Cornell University arXiv, arXiv.org [retrieved Dec. 12, 2022]. Retrieved from the Internet <https://arxiv.org/pdf/2004.08887.pdf>., Apr. 19, 2020, 10 Pages.

Yang, Ziqi, et al., "Automated identification of sensitive data from implicit user specification", Cybersecur vol. 1, No. 13 [retrieved Dec. 12, 2022]. Retrieved from the Internet <https://web.archive.org/web/20200209181054id_/https://cybersecurity.springeropen.com/track/pdf/10.1186/s42400-018-0011-x>., Sep. 29, 2018, 15 Pages.

Yeom, Samuel, "Privacy Risk in Machine Learning: Analyzing the Connection to Overfitting?", Cornell University arXiv, arXiv.org [retrieved Dec. 12, 2022]. Retrieved from the Internet <https://arxiv.org/pdf/1709.01604.pdf>., May 4, 2018, 27 Pages.

Yin, Hongxu, et al., "See Through Gradients: Image Batch Recovery via GradInversion", IEEE/CVF Conference on Computer Vision and Pattern Recognition [retrieved Dec. 12, 2022]. Retrieved from the Internet <https://arxiv.org/pdf/2104.07586.pdf>., Apr. 15, 2021, 13 Pages.

Zhao, Bo, et al., "iDLG: Improved Deep Leakage from Gradients", Cornell University arXiv, arXiv.org [retrieved Dec. 12, 2022]. Retrieved from the Internet <https://arxiv.org/pdf/2001.02610.pdf>., Jan. 8, 2020, 5 Pages.

Zhao, Yang, et al., "Local Differential Privacy based Federated Learning for the Internet of Things", IEEE Internet of Things Journal (IoT-J) [retrieved Dec. 12, 2022]. Retrieved from the Internet <https://arxiv.org/pdf/2004.08856.pdf>., Dec. 22, 2020, 33 Pages.

Zhu, Ligeng, et al., "Deep Leakage from Gradients", NIPS'19: Proceedings of the 33rd International Conference on Neural Information Processing Systems <https://proceedings.neurips.cc/paper/2019/file/60a6c4002cc7b29142def8871531281a-Paper.pdf>., Jun. 21, 2019, 10 Pages.

* cited by examiner

My name is Jon Doe and I am calling to schedule an appointment with Dr. Smith. I wanted to check whether your clinic accepts my new health insurance. It is American Insurance and the policy number is 1234567. I like this more than my old health insurance because it has lower copayments. But your clinic did accept my old health insurance. Can you please also check to see if you have a copy of the results of the testing that Dr. Smith scheduled after my accident last month? I have the date that the testing was performed which was January 1st if that is helpful. It might be filed under Smith-Jones which is the law firm that Dr. Smith recommended to help me recover money from the insurance company that represents Jane Doe who is my ex-wife. We got divorced after the accident and don't speak much anymore. But I did see her the other day when I paid her $1234. That was Monday I think. She asked me to tell Dr. Smith hello for her so please pass that along to Dr. Smith if you remember it. Do you know the doctor's first name? Jane asked me if I knew and I used to know but I can't remember if it is Jim or Jake. It is something that starts with the letter "J" I am sure. I guess I can ask him at my appointment.

Fig. 3

My name is Jon Doe and I am calling to schedule an appointment with Dr. Smith. I wanted to check whether your clinic accepts my new health insurance. It is American Insurance and the policy number is 1234567. I like this more than my old health insurance because it has lower copayments. But your clinic did accept my old health insurance. Can you please also check to see if you have a copy of the results of the testing that Dr. Smith scheduled after my accident last month? I have the date that the testing was performed which was January 1st if that is helpful. It might be filed under Smith-Jones which is the law firm that Dr. Smith recommended to help me recover money from the insurance company that represents Jane Doe who is my ex-wife. We got divorced after the accident and don't speak much anymore. But I did see her the other day when I paid her $1234. That was Monday I think. She asked me to tell Dr. Smith hello for her so please pass that along to Dr. Smith if you remember it. Do you know the doctor's first name? Jane asked me if I knew and I used to know but I can't remember if it is Jim or Jake. It is something that starts with the letter "J" I am sure. I guess I can ask him at my appointment.

Fig. 4

TRAINING LANGUAGE MODELS AND PRESERVING PRIVACY

RELATED APPLICATIONS

This application claims priority to U.S. Provisional Application Ser. No. 63/413,519, filed Oct. 5, 2022.

BACKGROUND

Machine learning models are trainable to perform tasks using training data. For instance, the training data describes examples related to a task and a machine learning model is trained to perform the task by adjusting parameters of the model based on the examples described by the training data and an objective function (e.g., a loss function). After this training, the machine learning model receives an input and then performs the task relative to the input using the adjusted parameters.

SUMMARY

Techniques and systems for training language models and preserving privacy are described. In an example, a computing device implements a privacy system to receive input data describing a sequence of words. The privacy system performs a task relative to the sequence of words using a machine learning model trained on training data to perform tasks relative to sequences of words. For example, the task is a next word prediction task, a classification task, a query-response task, etc.

The training data describes a corpus of text associated with clients and including sensitive samples and non-sensitive samples. In one example, the privacy system trains the machine learning model by sampling a client of the clients and using a subset of the sensitive samples associated with the client and a subset of the non-sensitive samples associated with the client to update parameters of the machine learning model. The privacy system generates an indication of the task performed relative to the sequence of words for display in a user interface in an example.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 3 illustrates a representation of training data.

FIG. 4 illustrates a representation of identified clients, sensitive samples, and non-sensitive samples.

DETAILED DESCRIPTION

Overview

Figure 1:
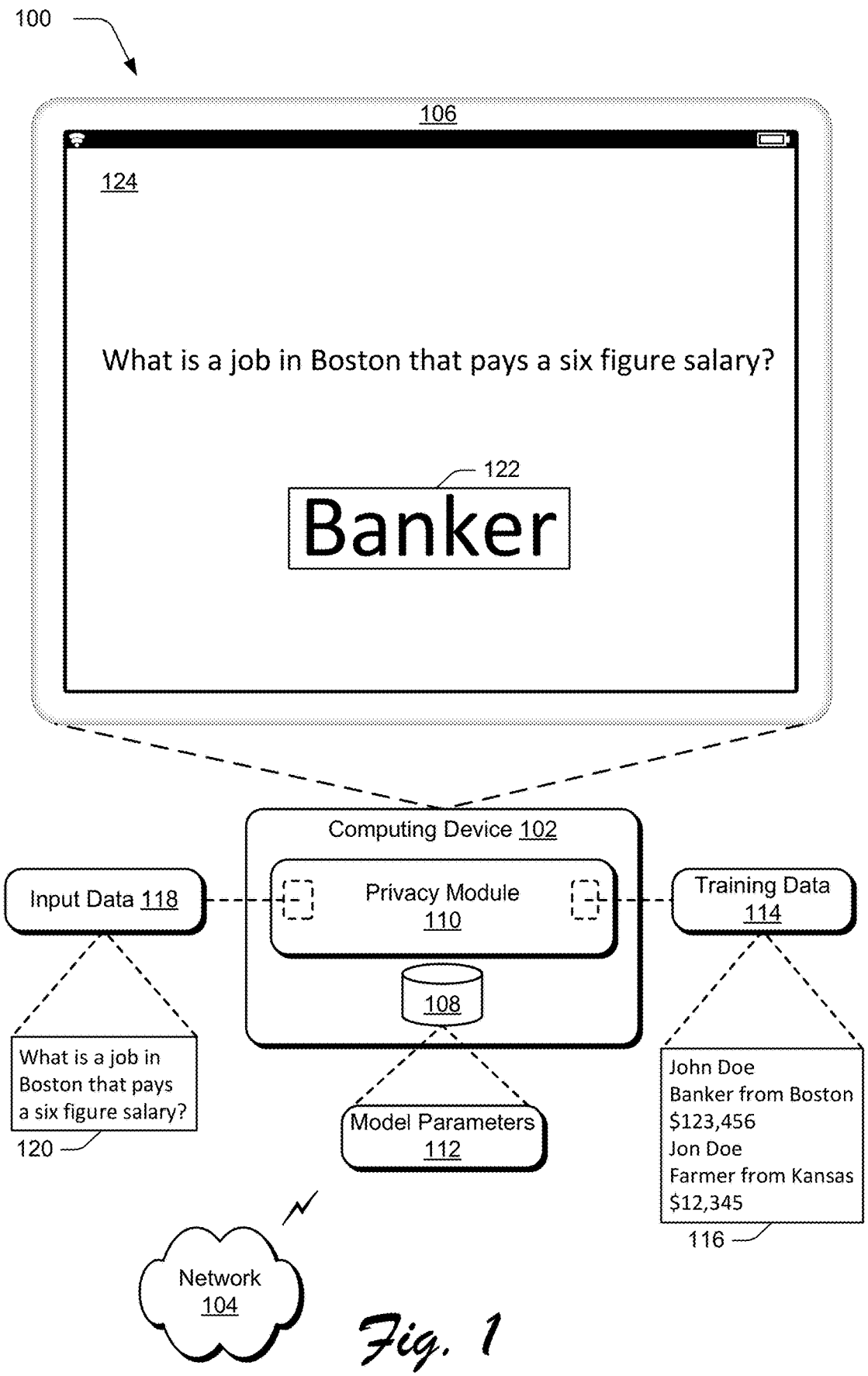
FIG. 1 is an illustration of an environment in an example implementation that is operable to employ digital systems and techniques for training language models and preserving privacy as described herein.

After a machine learning model (e.g., a natural language model) has been trained on training data describing a corpus of text to perform a task and parameters of the model have been adjusted based on the training, it is possible to extract information included in the corpus of text based on the adjusted parameters of the machine learning model. If the corpus of text includes confidential/private information (e.g., names of individuals, credit card numbers, private financial information, etc.), then this sensitive information is extractable using the parameters of the trained machine learning model. In an effort to prevent this, conventional systems rely on techniques to predict or identify instances of confidential information included in the corpus of text. These instances are then masked or sampled in a manner which reduces a probability that the instances of confidential information are extractable using the parameters of the trained model.

However, the techniques used by conventional systems to identify the instances of confidential information within the corpus of text are associated with an error rate. As a result of this error rate, some confidential information included in the corpus of text (e.g., confidential information misidentified as non-confidential information) is extractable using the parameters of the trained machine learning model. In order to overcome this limitation, techniques and systems for training language models and preserving privacy are described.

In an example, a computing device implements a privacy system to receive input data describing a sequence of words. The privacy system performs a task (e.g., a next word prediction, a classification, a response to a query, etc.) relative to the sequence of words by processing the input data using a machine learning model trained on training data to perform tasks relative to sequences of words. For example, the training data describes a corpus of text, and the machine learning model is a natural language model.

The corpus of text is associated with clients such as individuals or organizations, and the corpus of text includes both sensitive information (e.g., private/confidential information) and non-sensitive information (e.g., public/non-confidential information). In some examples, the privacy system identifies the clients, the sensitive information, and the non-sensitive information by processing the corpus of text using a named entity recognition model or a personal identifiable information recognition model. In these examples, the named entity recognition model and the personal identifiable information recognition model have an error rate (e.g., about 6 percent). As a result of the error rate, some information included in the non-sensitive information is misidentified and this information is private and/or confidential.

For example, the privacy system trains the machine learning model on the training data by determining sentences or paragraphs of the corpus of text having instances of the sensitive information as sensitive samples associated with some of the clients and determining sentences or paragraphs of the corpus of text having instances of the non-sensitive information (and no instances of the sensitive information) as non-sensitive samples associated with some of the clients. In this example, the privacy system trains the machine learning model in training rounds by considering the non-sensitive samples to be a single class of the sensitive samples. In each round of training the machine learning model on the training data, the privacy system samples a subset of the clients. For each client included in the subset, the privacy system samples a subset of the sensitive samples associated with the client and a subset of the non-sensitive samples associated with the client.

In some examples, the privacy system utilizes federated learning to compute a gradient of model parameters for each client included in the subset. In these examples, the privacy system clips each of the per-client gradients based on a predefined gradient clipping bound. Next, in one example, the privacy system uses a weighted average estimator to compute an average gradient based on the clipped gradients. The average gradient is used along with Gaussian noise to update parameters of the machine learning model in a round of training the machine learning model.

By training the machine learning model such that identified non-sensitive samples are considered the single class of identified sensitive samples in this way, any instances of confidential/private information incorrectly identified as non-sensitive samples are still protected (e.g., with a computable probability and privacy budget) from being extracted using parameters of the trained machine learning model. As a result, the described systems are capable of receiving the input data describing the sequence of words and performing a task relative to the sequence of words such as predicting a next word following a last word, classifying the sequence, or answering a natural language question asked in the sequence without a risk of potentially revealing any private/confidential information which is not possible using conventional systems. Additionally, since the described systems for training language models and preserving privacy sample from identified non-sensitive samples in addition to sampling from identified sensitive samples, the machine learning model is trainable using less injected Gaussian noise and under a same privacy budget which is a further improvement relative to conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For instance, the computing device 102 includes a storage device 108 and a privacy module 110. The storage device 108 is illustrated to include model parameters 112 of a machine learning model or multiple machine learning models.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

In an example, the privacy module 110 includes or has access to the machine learning model (or the multiple machine learning models). For example, the machine learning model includes a Long Short Term Memory model, a Bidirectional Encoder Representations for Transformers model, a Generative Pretrained Transformer 2 model, etc. The privacy module 110 is illustrated as having, receiving, and/or transmitting training data 114 which the privacy module 110 uses to train the machine learning model on a task such as a next word prediction task, a text classification task, a natural language query-response task, and so forth. For instance, the privacy module 110 and/or the machine learning model updates or modifies the model parameters 112 as the machine learning model is trained on the training data 114 to perform the task.

Consider an example in which the privacy module 110 receives the training data 114 via the network 104. In this example, a user interacts with an input device (e.g., a stylus, a mouse, a keyboard, a touchscreen, etc.) to transmit the training data 114 to the privacy module 110 via the network 104. The training data 114 describes a corpus of text 116 that is associated with clients which are identifiable individuals and/or organizations included in the corpus of text 116 in an example.

Continuing the example, the corpus of text 116 identifies a first client as "John Doe" and a second client as "Jon Doe." The corpus of text 116 also includes sensitive samples and non-sensitive samples of the training data 114. The sensitive samples include private and/or personal information such as a salary of "$123,456" for "John Doe" and a salary of "$12,345" for "Jon Doe." The non-sensitive samples include information that is not private and/or personal such as a job title and location of "John Doe" as "Banker from Boston" and a job title and location of "Jon Doe" as "Farmer from Kansas." Although the job titles and locations are non-sensitive samples in this example, in other examples, job titles and locations of individuals are considered sensitive samples.

In some examples, the clients, the sensitive samples, and the non-sensitive samples are identified in the training data 114 by processing the corpus of text 116 using a named entity recognition model or another natural language model capable of identifying the clients, the sensitive samples, and the non-sensitive samples. For instance, the named entity recognition model determines the clients, the sensitive samples, and the non-sensitive samples by processing the training data 114. The privacy module 110 receives the training data 114 and trains the machine learning model on the training data 114 to perform a natural language query-response task. In order to ensure that the clients and the sensitive samples included in the training data 114 are not discoverable via the model parameters 112 of the machine learning model trained on the training data 114, the privacy module 110 trains the machine learning model in a manner which preserves privacy of the clients and the sensitive samples.

To do so in one example, the privacy module 110 processes the training data 114 to sample a subset of the clients. In this example, the privacy module 110 samples "John Doe" from the two clients identified in the corpus of text 116. For example, the privacy module 110 samples a subset of the sensitive samples associated with the sampled client "John Doe" such as "123,456" and a subset of the non-sensitive samples associated with "John Doe" such as "Banker from Boston." Continuing this example, the privacy module 110 uses federated learning to compute a gradient of the model parameters 112 for the sampled client "John Doe" and clips the gradient for "John Doe" using a predefined clipping bound.

The privacy module 110 generates the clipped gradient for "John Doe" and also generates an additional clipped gradient for any additional clients included in the sample of the clients. For example, the privacy module 110 computes an average gradient based on the clipped gradient for "John Doe" and the additional clipped gradients (if any). The privacy module 110 then adds Gaussian noise to the average gradient and updates the model parameters 112 for the machine learning model (e.g., performs one iteration of training the machine learning model) based on the Gaussian noise and the average gradient.

In one example, a moments accountant of the privacy module 110 computes a privacy budget for training the machine learning model based on a number of training iterations as the privacy module 110 trains the machine learning model. The privacy module 110 trains the machine learning model in the manner described above for the number of training rounds. After this training, the privacy module 110 implements the trained machine learning model to perform the natural language query-response task relative to input data 118.

As shown in FIG. 1, the privacy module 110 receives the input data 118 as describing a natural language question 120 which states "What is a job in Boston that pays a six figure salary?" The privacy module 110 processes the input data 118 using the trained machine learning model to generate an answer 122 which is displayed in a user interface 124 of the display device 106. The answer 122 states "Banker" but does not indicate any information identifying "John Doe" or the salary of "$123,456." Accordingly, the trained machine learning model generates the answer 122 to the natural language question 120 based on the model parameters 112 (e.g., information included in the training data 114) in a manner which preserves privacy of the clients and the sensitive samples. By sampling subsets of both the sensitive samples and the non-sensitive samples to train the machine learning model, the privacy module 110 maintains privacy of the sensitive samples included in the training data 114 even in scenarios in which the named entity recognition model misclassifies some of the sensitive samples as being non-sensitive samples.

Figure 2:
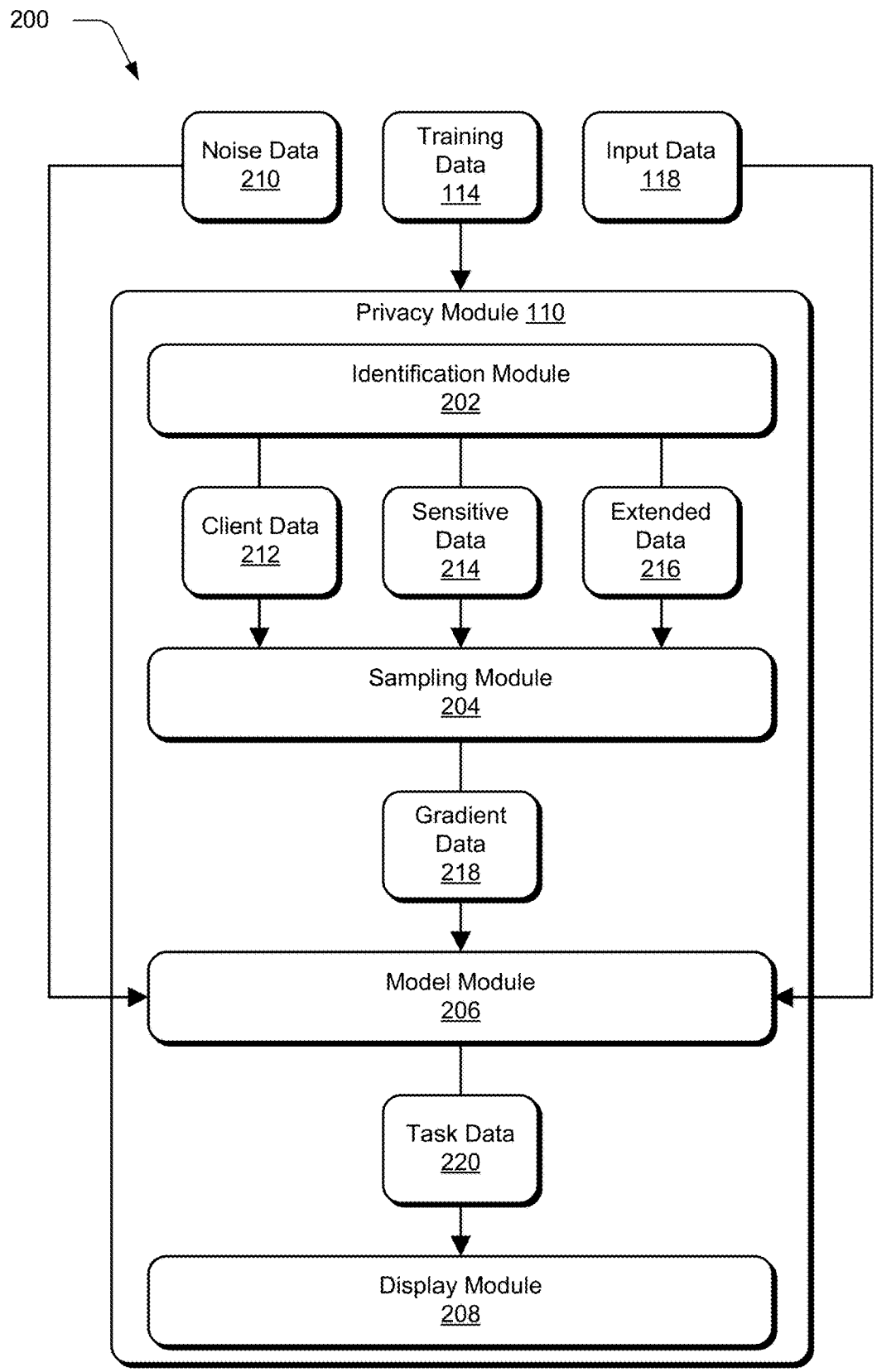
FIG. 2 depicts a system in an example implementation showing operation of a privacy module for training language models and preserving privacy.

FIG. 2 depicts a system 200 in an example implementation showing operation of a privacy module 110. The privacy module 110 is illustrated to include an identification module 202, a sampling module 205, a model module 206, and a display module 208. For example, the privacy module 110 receives the training data 114, the input data 118, and noise data 210 as inputs. In this example, the identification module 202 receives and processes the training data 114 to generate client data 212, sensitive data 214 and extended data 216.

FIG. 3 illustrates a representation 300 of training data 114. The training data 114 describes a corpus of text which includes sixteen sentences in the representation. For example, the sixteen sentences are transcribed from a recorded phone call between "Jon Doe" and a receptionist at a clinic in which "Jon Doe" attempts to schedule an appointment with "Dr. Smith." The identification module 202 processes the training data 114 using a named entity recognition model in one example to identify clients, sensitive samples, and non-sensitive samples included in the training data 114.

FIG. 4 illustrates a representation 400 of identified clients, sensitive samples, and non-sensitive samples. After processing the training data 114 using the named entity recognition model and/or a personal identifiable information recognition model, the identification module 202 generates the client data 212 as describing clients identified in the training data 114, the sensitive data 214 as describing sensitive samples identified in the training data 114, and the extended data 216 as describing non-sensitive samples identified in the training data 114. As shown, a first sentence of the processed training data 114 includes an indication 402 of a client "Jon Doe" and an indication 404 of a client "Dr. Smith."

A third sentence of the processed training data 114 includes an indication 406 of a client "American Insurance"

and an indication 408 of a sensitive sample "policy number is 1234567." A sixth sentence of the processed training data 114 includes an indication 410 of the client "Dr. Smith" and an indication 412 of "last month" which is temporal information. In some examples, the indication 412 corresponds to a sensitive sample (e.g., usable to ascertain private/confidential information). In other examples, the indication 412 corresponds to a non-sensitive sample.

A seventh sentence of the processed training data 114 includes an indication 414 of a sensitive sample "January 1st" which is usable in combination with other information included in the training data 114 to identify private information of the client "Jon Doe." As shown, an eighth sentence of the processed training data 114 includes an indication 416 of a client "Smith-Jones" as well as an indication 418 of the client "Dr. Smith." The eighth sentence also includes an indication 420 of a client "Jane Doe."

A tenth sentence of the processed training data 114 includes an indication 422 of a sensitive sample "I paid her $1234." For instance, an eleventh sentence of the processed training data 114 includes an indication 424 of "Monday" which is temporal information that is a sensitive sample in some examples and a non-sensitive sample in other examples. A twelfth sentence of the processed training data 114 includes an indication 426 of the client "Dr. Smith" and another indication 428 of the client "Dr. Smith."

As illustrated in the representation 400, a fourteenth sentence of the processed training data 114 includes an indication 430 of a client "Jane" and an indication 432 of a client "Jim or Jake." For example, the identification module 202 generates the client data 212 as describing indications 402-406, 410, 416-420, and 426-432. In one example, the identification module 202 generates the sensitive data 214 as describing the first, third, sixth, seventh, eighth, tenth, eleventh, twelfth, and fourteenth sentences of the processed training data 114. In another example, the identification module 202 generates the extended data 216 as describing the second, fourth, fifth, ninth, thirteenth, fifteenth, and sixteenth sentences of the processed training data 114.

In some examples, the identification module 202 generates the extended data 216 as describing the tenth sentence of the processed training data 114 even though the tenth sentence includes the indication 422 of the sensitive sample "I paid her $1234." In these examples, the named entity recognition model and/or the personal identifiable information recognition model are associated with a relatively small error rate (e.g., about 6 percent). Because of this relatively small error rate, the sensitive data 214 describes some non-sensitive samples misidentified by the named entity recognition model and/or the personal identifiable information recognition model.

Similarly, the extended data 216 describes some sensitive samples misidentified by the named entity recognition model and/or the personal identifiable information recognition model as being non-sensitive samples. Notably, in the example in which the sixteen sentences are transcribed from the recorded phone call between "Jon Doe" and the receptionist at the clinic, the transcription is also associated with a relatively small error rate (e.g., an additional error rate contributing to a number of sensitive samples misidentified by the named entity recognition model and/or the personal identifiable information recognition model). For instance, in order to avoid potentially exposing any sensitive samples described by the extended data 216, the privacy module 110 considers the non-sensitive samples and any sensitive samples described by the extended data 216 to be a single type of sensitive sample.

In an example, this is representable as the training data 114 denoted as D, the clients described by the client data 212 denoted as U, the sensitive samples described by the sensitive data 214 denoted as E, and an extended set of sensitive samples described by the extended data 216 denoted as S. In this example, instead of sampling only the sensitive data 214 E to train the machine learning model, the privacy module 110 implements the sampling module 204 to sample E∪S to train the machine learning model. Accordingly, by sampling from S in addition to sampling from E, the sampling module 204 preserves privacy of any sensitive samples that are incorrectly described by the extended data 216 based on the relatively small error rate of the named entity recognition model and/or the personal identifiable information recognition model.

Consider two example databases D and D' that describe training data which includes clients, sensitive samples, and non-sensitive samples. The two example databases D and D' are client-content adjacent if the databases D and D' differ by one client u' and one sensitive sample e' such that the one client u' and the one sensitive sample e' are included in one of the databases (e.g., D') and the one client u' and the one sensitive sample e' are excluded from the other one of the databases (e.g., D). Thus, all sentences/paragraphs associated with the one client u' are absent from D and all sentences/paragraphs including the one sensitive sample e' are also absent from D. For example:

$$\|U-U'\|_1 \leq 1 \text{ and } \|E-E'\|_1 \leq 1$$

where: U represents clients in D; E represents sensitive samples in D; U' represents clients in D'; and E' represents sensitive samples in D'.

In an example, for given client-content adjacent databases, a randomized algorithm A for all outcomes O⊆Range (A) and for all client-content databases D and D', then:

$$Pr[A(D)=O] \leq e^{\varepsilon} Pr[A(D')=O] + \delta$$

where: ε represents a privacy budget and δ represents a broken probability (e.g., a probability of a failure to preserve privacy).

For instance, the sampling module 204 receives and processes the client data 212, the sensitive data 214, and the extended data 216 to generate gradient data 218 as describing an average gradient computed from clipped client gradients that are computed based on the client data 212, the sensitive data 214, and the extended data 216 at each training round t for training a machine learning model included in the model module 206. In an example, the machine learning model includes or has access to the Long Short Term Memory model, the Bidirectional Encoder Representations for Transformers model, the Generative Pretrained Transformer 2 model, and so forth.

Figure 5:
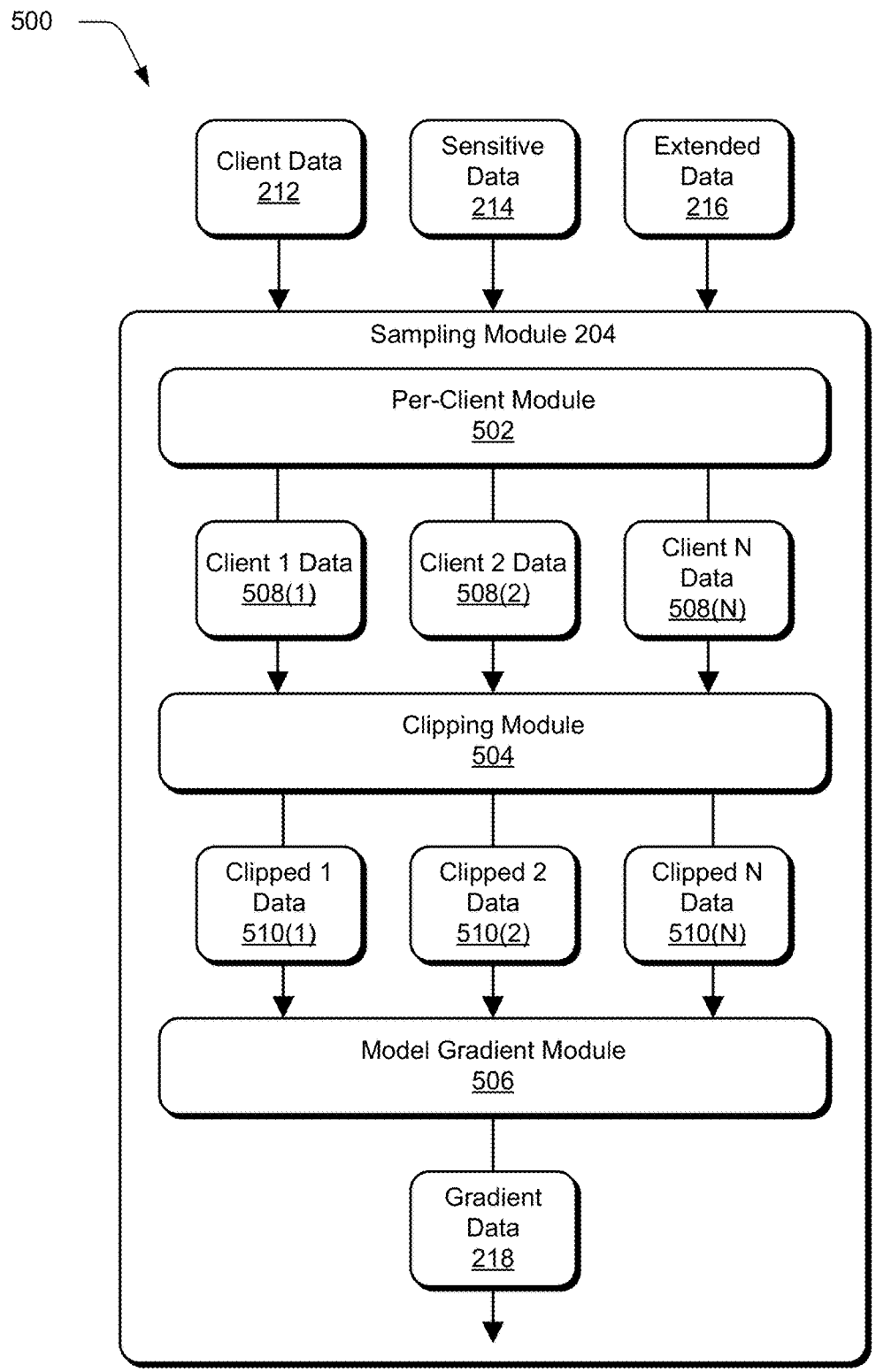
FIG. 5 illustrates a system in an example implementation showing operation of a sampling module for training a machine learning model.

FIG. 5 illustrates a system 500 in an example implementation showing operation of a sampling module 204. The sampling module 204 is illustrated to include a per-client module 502, a clipping module 504, and a model gradient module 506. For example, the per-client module 502 receives and processes the client data 212, the sensitive data 214, and the extended data 216 and at each training round t, the per-client module 502 randomly samples $U^t$ clients from the client data 212, $E^t$ sensitive samples from the sensitive data 214, and $S^t$ extended sensitive samples from the extended data 216 at sampling rates of $q_u$, $q_e$, and $q_s$, respectively.

The sampling module 204 uses all sentences/paragraphs in $E_u^t \cup S_u^t$ having a sensitive sample in $E^t$ and $S^t$ associated with sampled clients $U^t$ to train the machine learning model in each training round t. In an example, the sampled clients $U^t$ include samples of 1, 2, ... N clients. For example, the per-client module 502 computes gradients of the model parameters 112 for each of the 1, 2, ... N sampled clients denoted as $\Delta_{u,\varepsilon}^{t+1}$. As shown in FIG. 5, the per-client module 502 generates client 1 data 508(1) as describing a computed gradient of the model parameters 112 for client 1, client 2 data 508(2) as describing a computed gradient of the model parameters 112 for client 2, and client N data 508(N) as describing a computed gradient of the model parameters 112 for client N.

For instance, the clipping module 504 receives and processes the client 1 data 5-8(1), the client 2 data 508(2), and the client N data 508(N) to clip the gradient of the model parameters 112 for client 1, the gradient of the model parameters 112 for client 2, and the gradient of the model parameters 112 for client N, respectively. The clipping module 504 then clips the per-client gradients $\Delta_{u,\varepsilon}^{t+1}$ such that an $l_2$ norm is bounded by a predefined gradient clipping bound $\beta$. For example, the clipping module 504 generates clipped 1 data 510(1) as describing the clipped gradient of the model parameters 112 for client 1, clipped 2 data 510(2) as describing the clipped gradient of the model parameters 112 for client 2, and clipped N data 510(N) as describing the clipped gradient of the model parameters 112 for client N.

As shown, the model gradient module 506 receives and processes the clipped 1 data 510(1), the clipped 2 data 510(2), and the clipped N data 510(N) to generate the gradient data 218. In an example, the model gradient module 506 leverages a weighted average estimator $f_{\varepsilon^+}$ to compute an average gradient $\Delta^{t+1}$ based on the clipped gradients $\Delta_{u,\varepsilon}^{t+1}$. The model gradient module 506 generates the gradient data 218 as describing the average gradient $\Delta^{t+1}$.

With reference to FIG. 2, the model module 206 receives the gradient data 218 as describing the average gradient $\Delta^{t+1}$ and the noise data 210 as describing random Gaussian noise $N(0, I\sigma^2)$. The model module 206 uses the gradient data 218 and the noise data 210 to train the machine learning model and update the model parameters 112. During this training, a moments account M is used to compute a privacy budget based on the training rounds t. In an example, to tighten a sensitivity bound, the weighted average estimator $f_{\varepsilon^+}$ is representable as:

$$f_{\varepsilon^+}(U^t, E^t) = \frac{\sum_{u \in U^t} w_u \Delta_{u,\varepsilon}^{t=1}}{q_u W_u (q_e W_e + q_s W_s)}$$

where: $\Delta_{u\varepsilon}^{t+1} = \sum_{e \in E_u} w_e \Delta_{u,e} + \sum_{s \in S_u} w_s \Delta_{u,s}$ and $w_u$, $w_e$, and $w_s \in [0,1]$ are weights associated with a client u, a sensitive sample e, and an extended senstive sample s.

In an example, the weights $w_u$, $w_e$, and $w_s$ capture an influence of a client and sensitive samples on an outcome of the machine learning model. Further, $\Delta_{u,e}$ and $\Delta_{u,s}$ are parameter gradients computed using sensitive samples $e \in E$ and $s \in S$. Additionally, $W_u = \sum_{u \in U} w_u$, $W_e = \sum_{e \in E} w_e$, and $W_s = \sum_{s \in S} w_s$. Since $\mathbb{E}[\sum_{e \in E_u} w_e + \sum_{s \in S_u} w_s] = q_e W_e + q_s W_s$, the estimator $f_{\varepsilon^+}$ is unbiased. Once a sensitivity of the estimator $f_{\varepsilon^+}$ is bounded, added Gaussian noise scaled to the sensitivity $\mathbb{S}(f_{\varepsilon^+})$ is usable to compute a privacy guarantee. For example, the noise scale $\sigma$ is representable as:

$$\sigma = z\mathbb{S}(f_{\varepsilon^+}) = \frac{z(q_u|U| + 1)\max(w_u)\beta}{q_u W_u (q_e W_e + q_s W_s)}$$

As shown above, the noise scale $\sigma$ is tighter than noise scales of conventional systems and is proportional to a number of sensitive samples used in training the machine learning model. Accordingly, the model module 206 is capable of injecting less Gaussian noise described by the noise data 210 into the machine learning model under a same privacy budget while improving the machine learning model's performance on a task learned based on the training.

Figure 6:
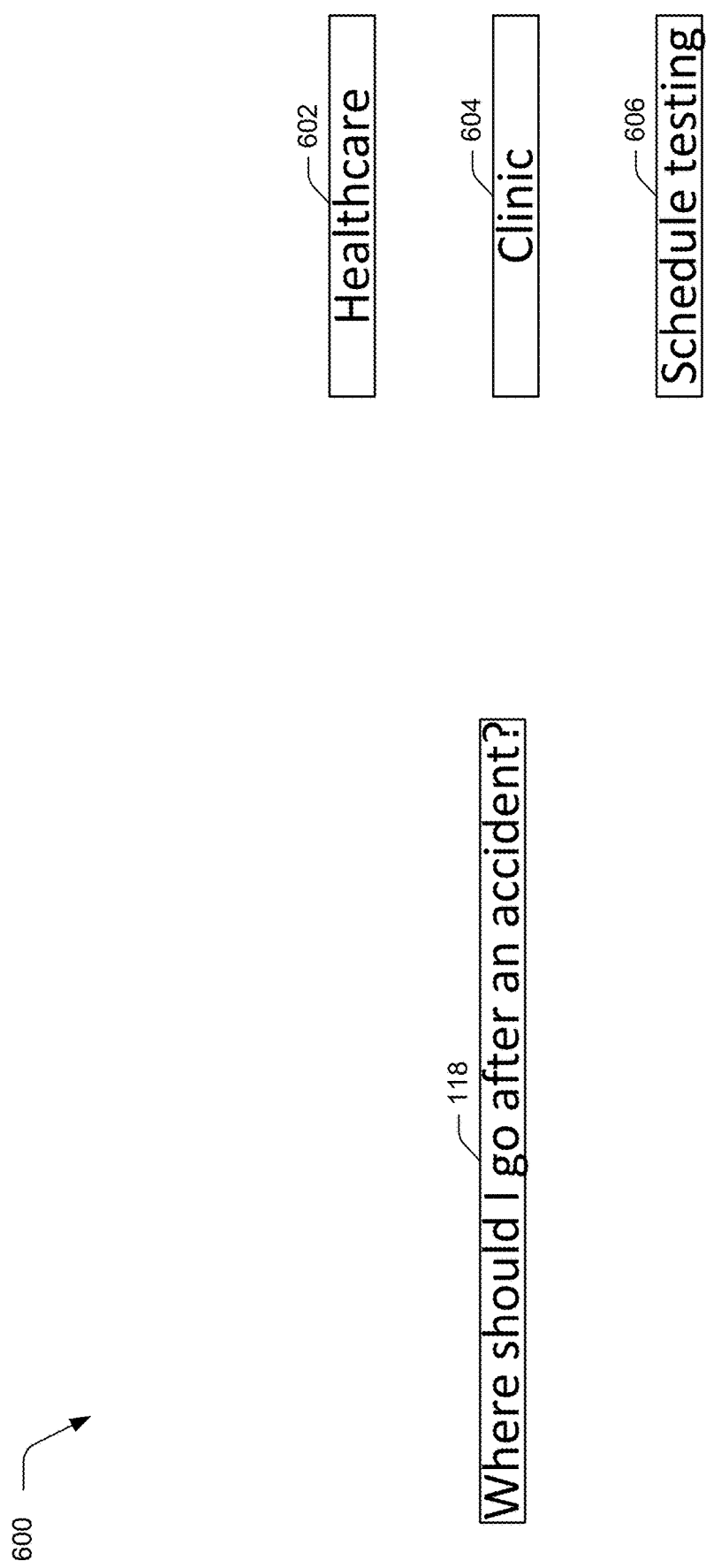
FIG. 6 illustrates a representation of input data and tasks performed based on the input data by a trained machine learning model.

For example, after training the machine learning model to perform a task using the gradient data 218 and the noise data 210, the model module 206 receives the input data 118. When the model module 206 receives the input data 118, then model module 206 causes the trained machine learning model to process the input data 118. FIG. 6 illustrates a representation 600 of input data and tasks performed based on the input data by a trained machine learning model. As shown in the representation 600, the input data 118 describes a sequence of text which is a natural language question and a sequence of words ending with a last word stating "Where should I go after an accident?". In a first example in which the model module 206 trains the machine learning model to perform a classification task, the model module 206 implements the trained machine learning model to process the input data 118 and generate task data 220 describing an output from the trained machine learning model based on the input data 118. In the first example, the display module 208 receives and processes the task data 220 to generate an indication 602 (e.g., for display in the user interface 124) which indicates "Healthcare." Accordingly, in this first example, the machine leaning model has classified the sequence of text described by the input data 118 as relating to healthcare.

In a second example in which the model module 206 trains the machine learning model to perform a next word prediction task, the trained machine learning model processes the input data 118 and outputs the task data 220 based on processing the input data 118. For example, the display module 208 receives and processes the task data 220 to generate an indication 604. The indication 604 conveys "Clinic." Thus, the machine learning model predicts that a word following a last word "accident" is "Clinic" in the second example. 100591 Consider a third example in which the model module 206 trains the machine learning model to perform a query-response task. The trained machine learning model processes the input data 118 as describing a natural language question and generates the task data 220 as describing an answer to the natural language question. For instance, the display module 208 receives and processes the task data 220 to generate an indication 606 which states "Schedule testing." In this third example, the machine learning model generates an answer to the natural language question "Where should I go aver an accident?" described by the input data 118 as "Schedule testing."

By considering identified non-sensitive samples from the training data 114 described by the extended data 216 to be a class of sensitive samples, the privacy module 110 is capable of preserving privacy of personal/confidential information included in the training data 114 even if some sensitive samples are incorrectly identified as non-sensitive samples. This is not possible in conventional systems which risk exposure of sensitive samples misidentified by the named entity recognition model and/or the personal identifiable information recognition model as being non-sensitive samples. Moreover, since the extended data 216 describes relevant information for performing tasks, training the machine learning model on data included in the extended data 216 improves the trained machine learning model's performance of the tasks which is a further improvement relative to conventional systems.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 7:
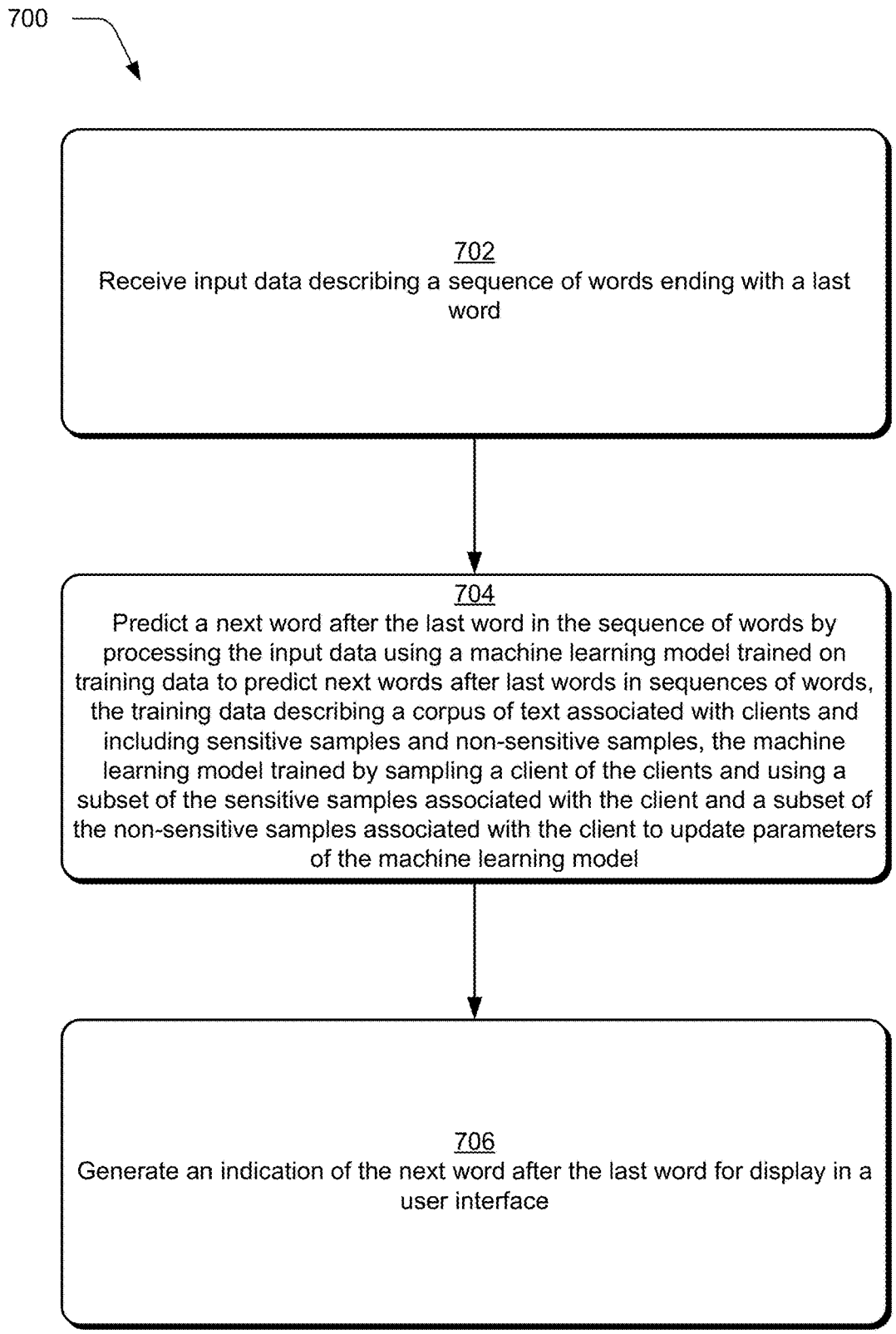
FIG. 7 is a flow diagram depicting a procedure in an example implementation in which an indication of a next word after a last word of a sequence of words is generated for display in a user interface.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which an indication of a next word after a last word of a sequence of words is generated for display in a user interface.

Input data is received describing a sequence of words ending with a last word (block 702). For example, the computing device 102 implements the privacy module 110 to receive the input data. A next word after the last word in the sequence of words is predicted by processing the input data using a machine learning model trained on training data to predict next words after last words in sequences of words, the training data describing a corpus of text associated with clients and including sensitive samples and non-sensitive samples, the machine learning model trained by sampling a client of the clients and using a subset of the sensitive samples associated with the client and a subset of the non-sensitive samples associated with the client to update parameters of the machine learning model (block 704). In an example, the privacy module 110 predicts the next word after the last word in the sequence of words. An indication of the next word after the last word is generated for display in a user interface (block 706). In one example, the computing device 102 implements the privacy module 110 to generate the indication of the next word after the last word for display in the user interface.

Figure 8:
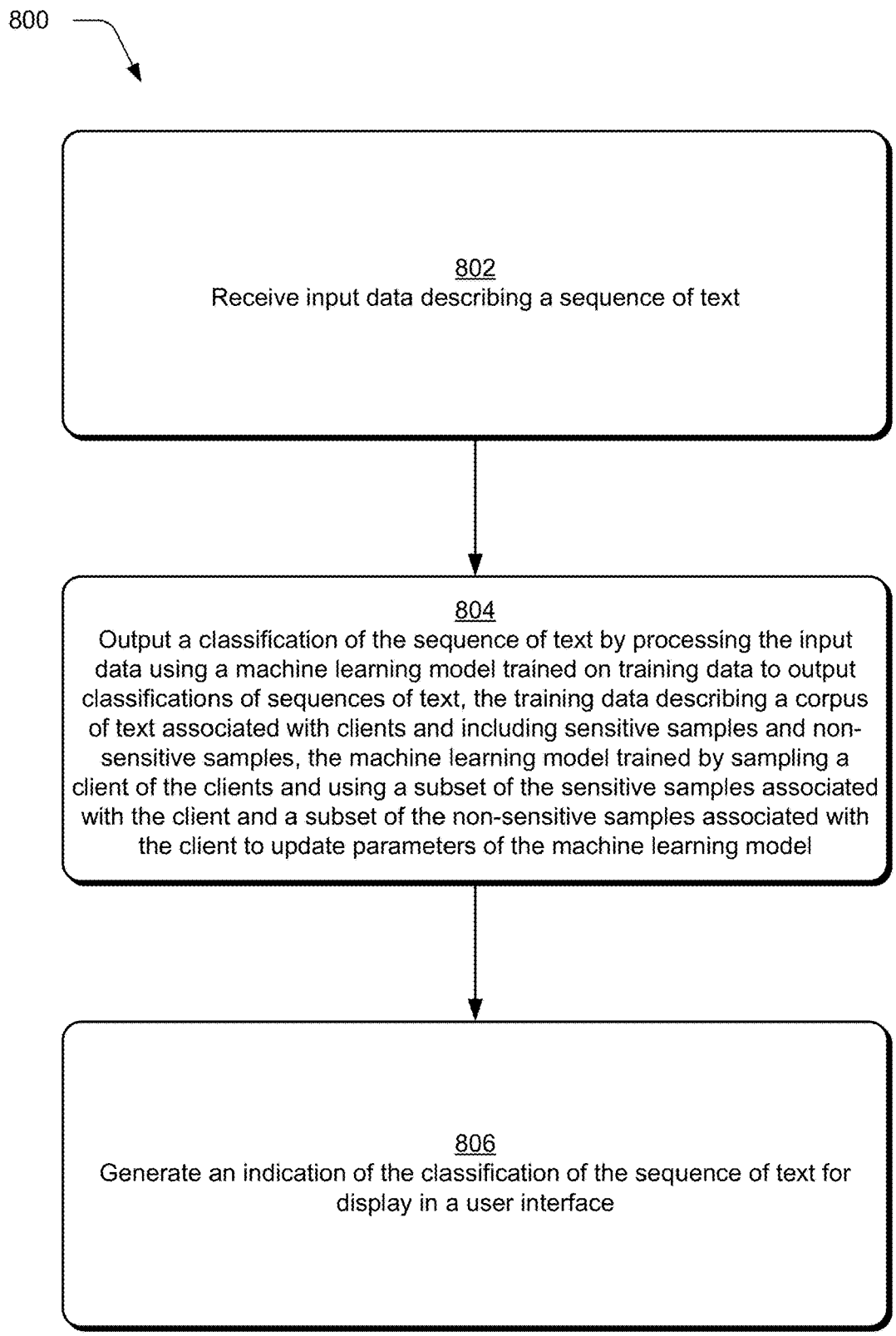
FIG. 8 is a flow diagram depicting a procedure in an example implementation in which an indication of a classification of a sequence of text is generated for display in a user interface.

FIG. 8 is a flow diagram depicting a procedure 800 in an example implementation in which an indication of a classification of a sequence of text is generated for display in a user interface. Input data is received describing a sequence of text (block 802). For example, the privacy module 110 receives the input data. A classification of the sequence of text is output by processing the input data using a machine learning model trained on training data to output classifications of sequences of text, the training data describing a corpus of text associated with clients and including sensitive samples and non-sensitive samples, the machine learning model trained by sampling a client of the clients and using a subset of the sensitive samples associated with the client and a subset of the non-sensitive samples associated with the client to update parameters of the machine learning model (block 804). In an example, the computing device 102 implements the privacy module 110 to output the classification of the sequence of text. An indication of the classification of the sequence of text is generated for display in a user interface (block 806). In some examples, the privacy module 110 generates the indication of the classification of the sequence of text.

Figure 9:
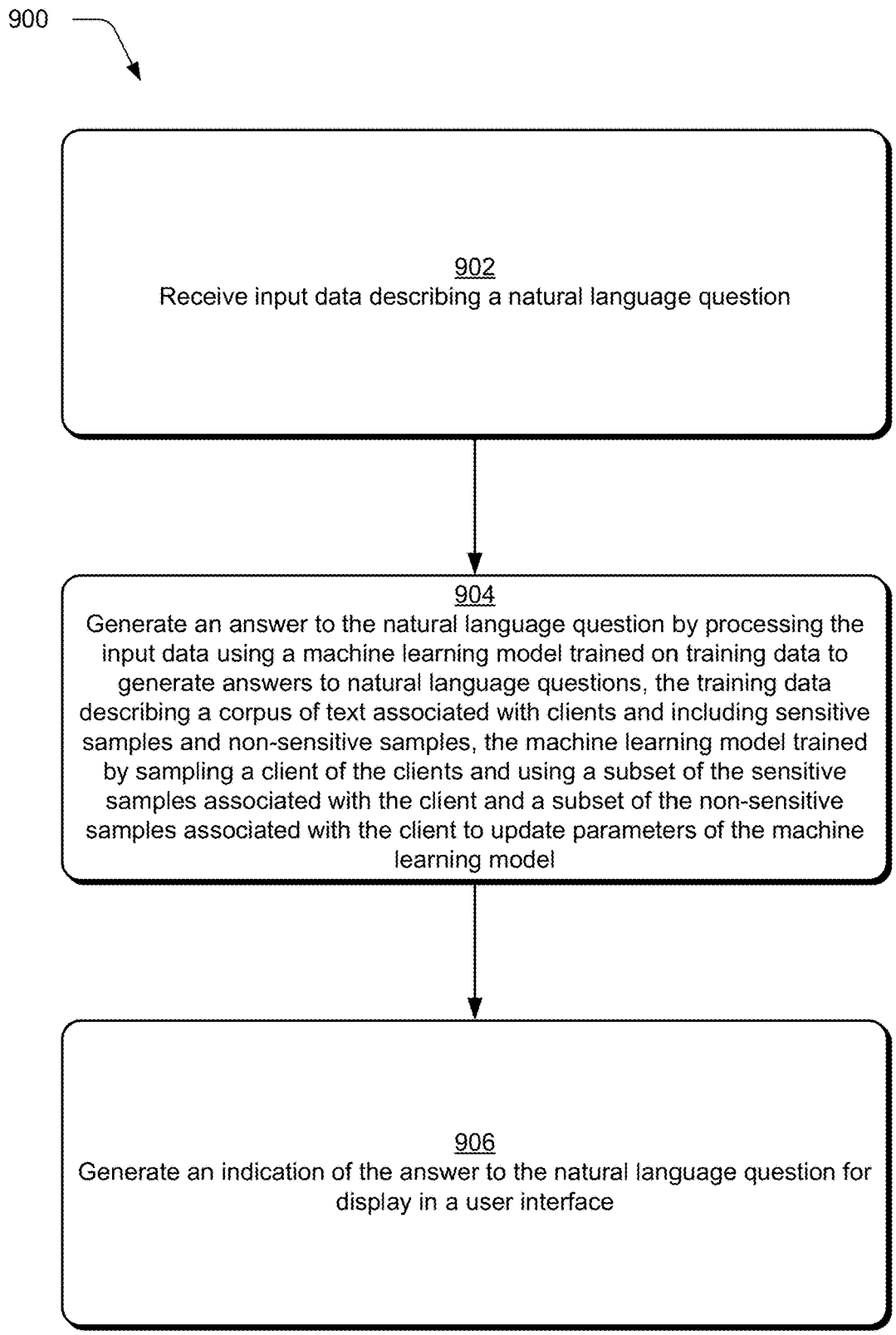
FIG. 9 is a flow diagram depicting a procedure in an example implementation in which an indication of an answer to a natural language question is generated for display in a user interface.

FIG. 9 is a flow diagram depicting a procedure 900 in an example implementation in which an indication of an answer to a natural language question is generated for display in a user interface. Input data is received describing a natural language question (block 902). In one example, the computing device 102 implements the privacy module 110 to receive the input data. An answer to the natural language question is generated by processing the input data using a machine learning model trained on training data to generate answers to natural language questions, the training data describing a corpus of text associated with clients and including sensitive samples and non-sensitive samples, the machine learning model trained by sampling a client of the clients and using a subset of the sensitive samples associated with the client and a subset of the non-sensitive samples associated with the client to update parameters of the machine learning model (block 904). For example, the privacy module 110 generates the answer to the natural language question. An indication of the answer to the natural language question is generated for display in a user interface (block 906). The privacy module 110 generates the indication of the answer to the natural language question in some examples.

Figure 10A:
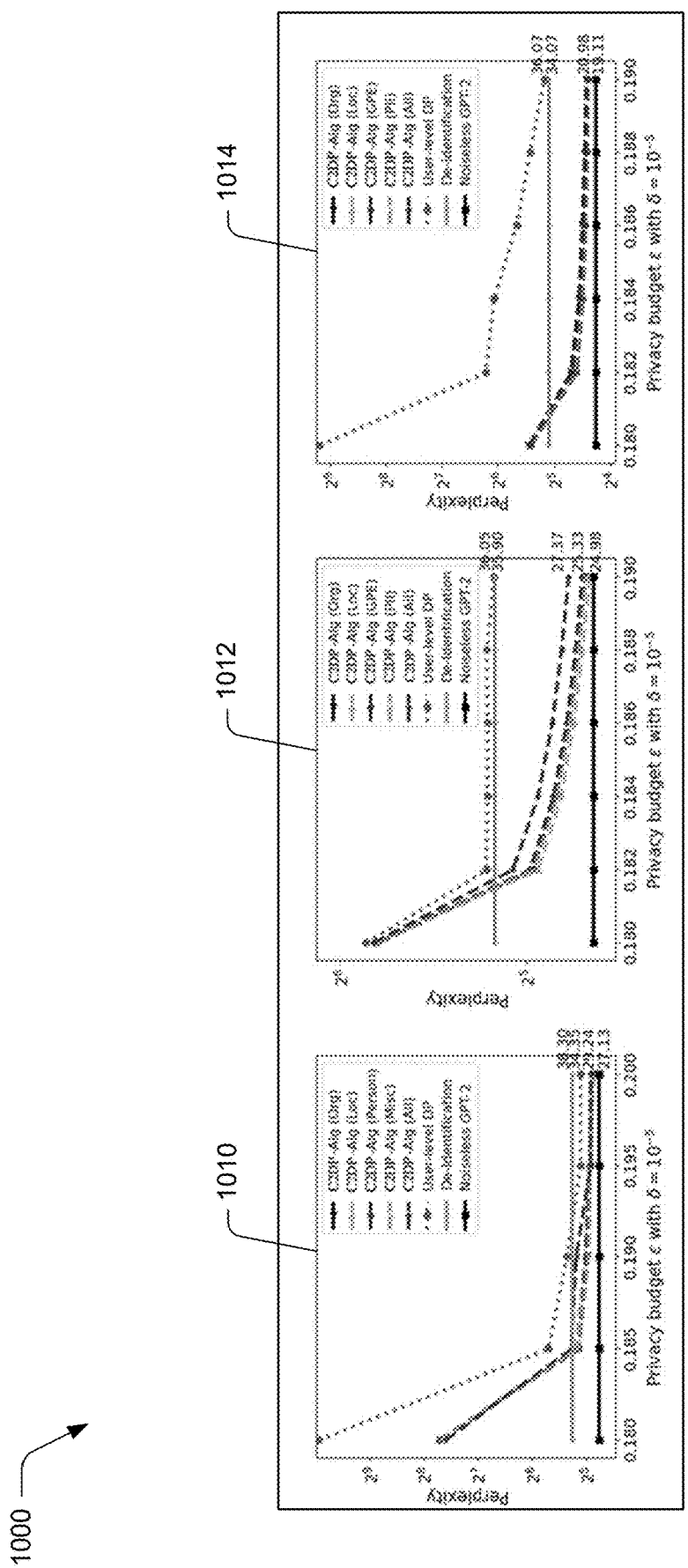
FIGS. 10A, 10B, 10C, 10D, and 10E illustrate examples of training models and preserving privacy with different models on multiple datasets.
Figure 10B:
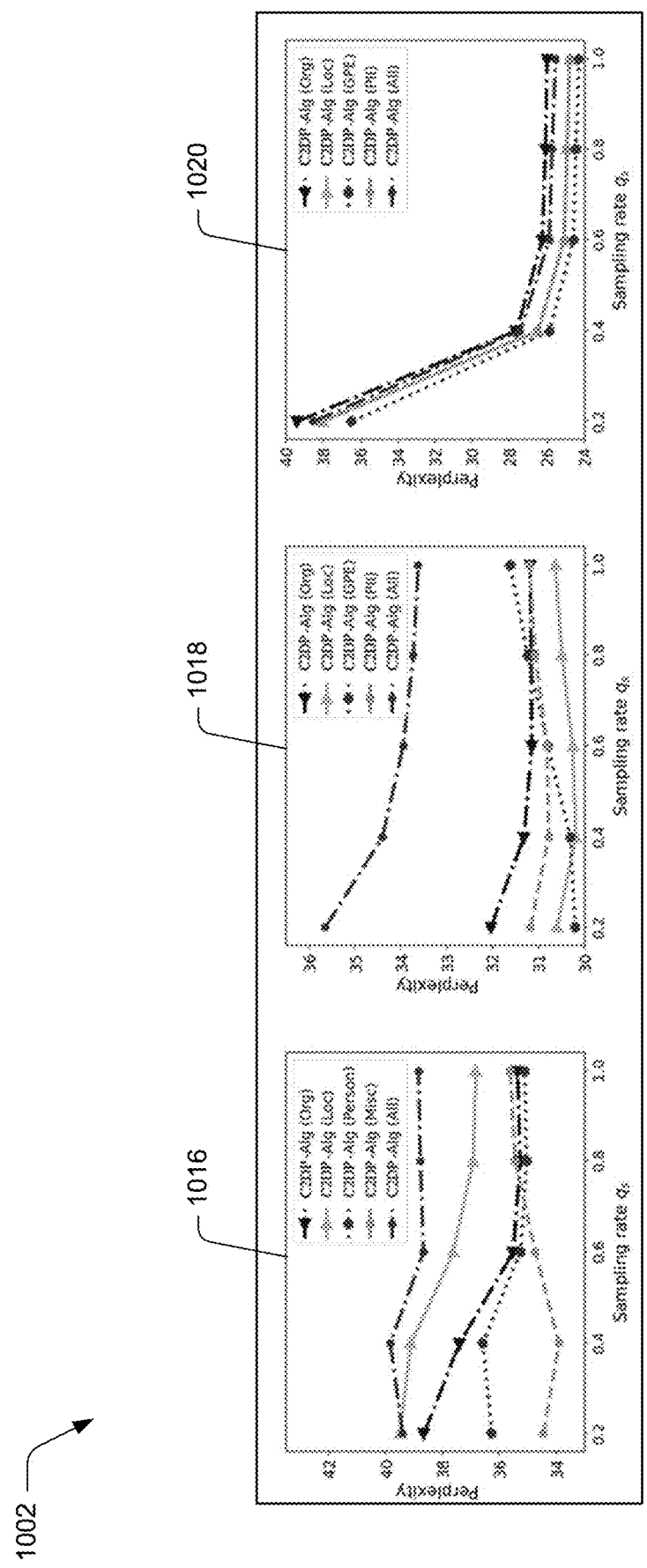
Figure 10C:
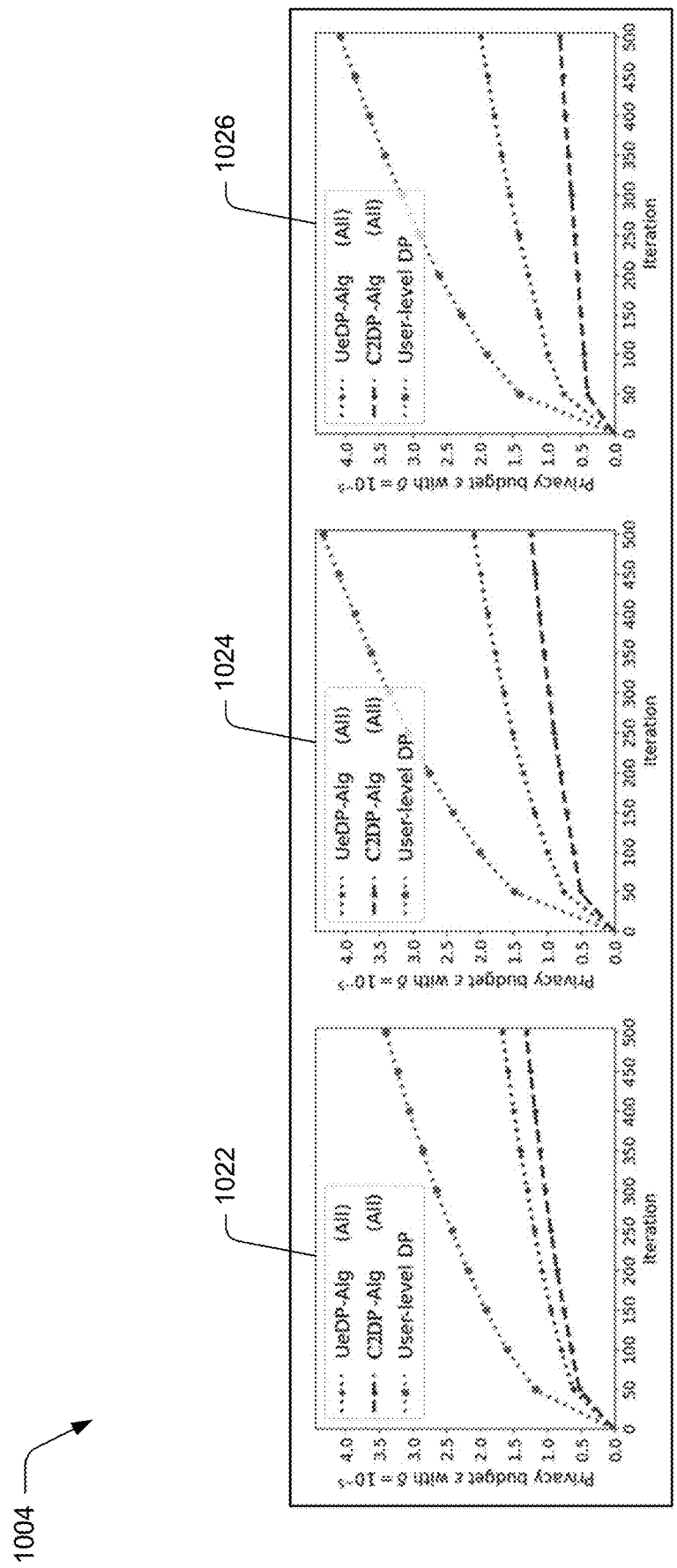
Figure 10D:
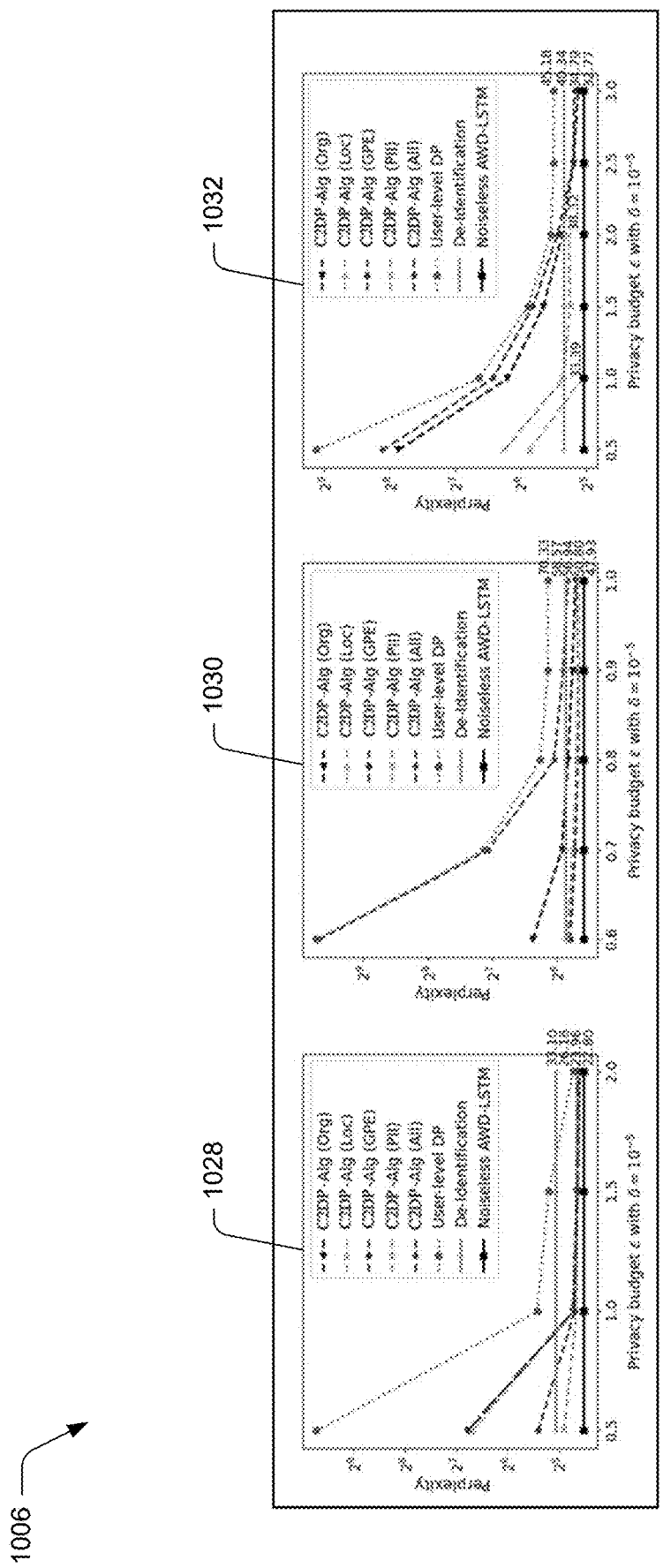
Figure 10I:
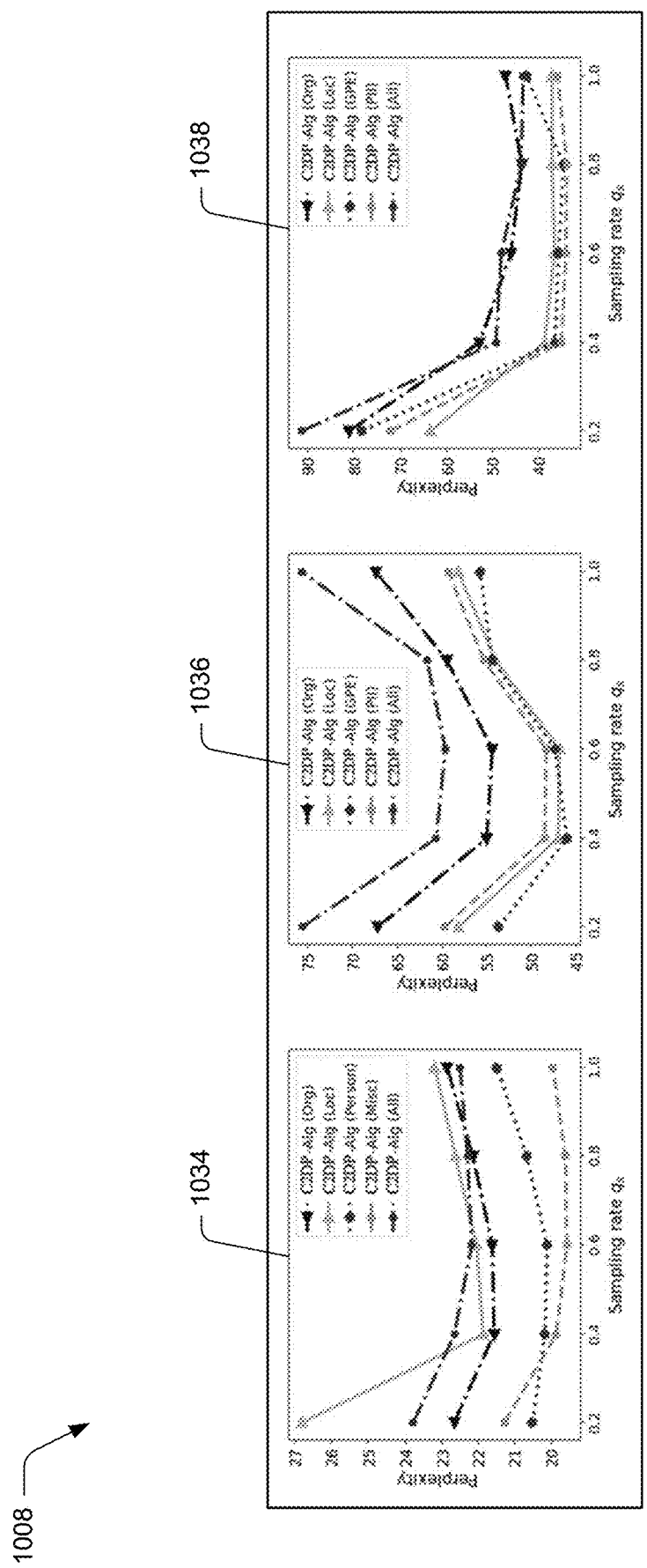

FIGS. 10A, 10B, 10C, 10D, and 10E illustrate examples of training models and preserving privacy with different models on multiple datasets. FIG. 10A illustrates a representation 1000 of next word prediction results on three datasets in a first example. FIG. 10B illustrates a representation 1002 of next word prediction results on three datasets in the first example at varying sample rates. FIG. 10C illustrates a representation 1004 of privacy budgets for three models on three datasets. FIG. 10D illustrates a representation 1006 of next word prediction results on three datasets in a second example. FIG. 10E illustrates a representation 1008 of next word prediction results on three datasets in the second example at varying sample rates.

The representation 1000 illustrated in FIG. 10A includes next word prediction results 1010-1014. For example, next word prediction results 1010 are based on a first dataset which includes 14,040 sentences, 1046 clients, and 11,176 sentences that have a sensitive sample. Next word prediction results 1012 are based on a second dataset which includes 112,000 sentences, 7,536 clients, and 67,157 sentences having a sensitive sample. For instance, next word prediction results 1014 are based on a third dataset that includes 5,188 sentences, 1,592 clients, and 2,166 sentences that have a sensitive sample. In the next word prediction results 1010-1014, "User-level DP" denotes use of a machine learning model as described by McMahan et al., *Learning Differentially Private Recurrent Language Models,* arXiv: 1710.06963v3 [cs.LG] (Feb. 24, 2018); "De-Identification" denotes use of masking as described by F. Dernoncourt et al., *De-identification of patient notes with recurrent neural networks,* Journal of American Medical Informatics Association, vol. 24, no. 3, pp. 596-606 (2017); "Noiseless GPT-2" denotes use of the Generative Pretrained Transformer 2 model without any privacy preserving modifications; "C2DP-Alg" refers to the described systems for training models and preserving privacy implemented using the Generative Pretrained Transformer 2 model; and "Org" indicates sensitive samples based on organizations, "Loc" indicates sensitive samples based on locations (non-GPE locations), "GPE" indicates sensitive samples based on geopolitical entities, "PII" indicates sensitive samples based on personal identifying information, and "All" indicates sensitive samples based on Org, Loc, GPE, and PII.

As shown in FIG. 10B, the representation 1002 includes next word prediction results 1016-1020 with different values for q s. Next word prediction results 1016 are relative to the first dataset, next word prediction results 1018 are relative to the second dataset, and next word prediction results 1020 are relative to the third dataset. The representation 1004 depicted in FIG. 10C includes privacy budget summaries 1022-1026 for two variations of the described systems and also "User-level DP." Privacy budget summary 1022 is based on the first dataset, privacy budget summary 1024 is based on the second dataset, and privacy budget summary 1026 is based on the third dataset. Next word prediction results 1028-1032 included in the representation 1006 of FIG. 10D correspond to the next word prediction results 1010-1014 using the Long Short Term Memory model in place of the Generative Pretrained Transformer 2 model on the first, second, and third datasets, respectively. Similarly, next word prediction results 1034-1038 as shown in FIG. 10E correspond to the next word prediction results 1016-1020 with different values for $q_s$ using the Long Short Term Memory model in place of the Generative Pretrained Transformer 2 model on the first, second, and third datasets, respectively.

Example System and Device

Figure 11:
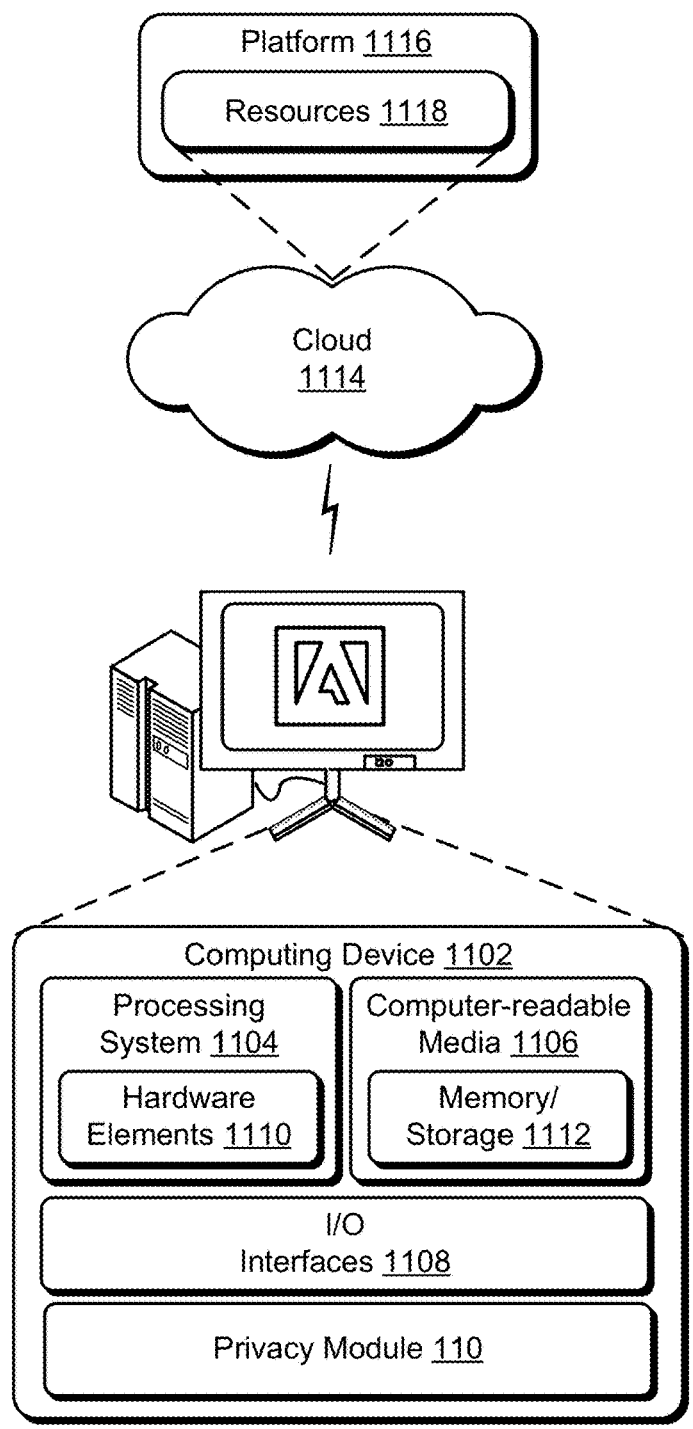
FIG. 11 illustrates an example system that includes an example computing device that is representative of one or more computing systems and/or devices for implementing the various techniques described herein.

FIG. 11 illustrates an example system 1100 that includes an example computing device that is representative of one or more computing systems and/or devices that are usable to implement the various techniques described herein. This is illustrated through inclusion of the privacy module 110. The computing device 1102 includes, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that are configured as processors, functional blocks, and so forth. This includes example implementations in hardware as an application specific integrated circuit or other logic device formed using one or more semiconductors. The hardware elements 1110 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1106 is illustrated as including memory/storage 1112. The memory/storage 1112 represents memory/storage capacity associated with one or more computer-readable media. In one example, the memory/storage 1112 includes volatile media (such as random access memory (RAM)) and/or nonvolatile media (such as read only memory (ROM), Flash memory, optical disks, magnetic disks, and so forth). In another example, the memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1110. For example, the computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein. 100801 The techniques described herein are supportable by various configurations of the computing device 1102 and are not limited to the specific examples of the techniques described herein. This functionality is also implementable entirely or partially through use of a distributed system, such as over a "cloud" 1114 as described below.

The cloud 1114 includes and/or is representative of a platform 1116 for resources 1118. The platform 1116 abstracts underlying functionality of hardware (e.g., servers) and software resources of the cloud 1114. For example, the resources 1118 include applications and/or data that are utilized while computer processing is executed on servers that are remote from the computing device 1102. In some examples, the resources 1118 also include services provided over the Internet and/or through a subscriber network, such as a cellular or Wi-Fi network.

The platform 1116 abstracts the resources 1118 and functions to connect the computing device 1102 with other computing devices. In some examples, the platform 1116 also serves to abstract scaling of resources to provide a corresponding level of scale to encountered demand for the resources that are implemented via the platform. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

Conclusion

Although implementations of systems for training language models and preserving privacy have been described in language specific to structural features and/or methods, it is to be understood that the appended claims are not necessarily limited to the specific features or methods described. Rather, the specific features and methods are disclosed as example implementations of systems for training language models and preserving privacy, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a processing device, input data describing a sequence of words ending with a last word;
predicting, by the processing device, a next word after the last word in the sequence of words by processing the input data using a machine learning model trained on injected Gaussian noise and training data to update parameters of the machine learning model to predict next words after last words in sequences of words, the training data describing a corpus of text associated with clients and including sensitive samples and non-sensitive samples taken from databases that are client-content adjacent as differing in that a client and a sensitive entity are present in one of the client-content adjacent databases and are not present in another one of the client-content adjacent databases; and
generating, by the processing device, an indication of the next word after the last word in the sequence of words for display in a user interface.

2. The method as described in claim 1, wherein the machine learning model includes at least one of a Long Short Term Memory model, a Bidirectional Encoder Representations from Transformers model, or a Generative Pretrained Transformer 2 model.

3. The method as described in claim 1, wherein the sensitive samples and the non-sensitive samples are identified by processing the corpus of text using a named entity recognition model.

4. The method as described in claim 3, wherein the non-sensitive samples include a sensitive sample from the corpus of text based on an error rate associated with the named entity recognition model.

5. The method as described in claim 3, wherein the sensitive samples include a non-sensitive sample from the corpus of text based on an identification error rate associated with the named entity recognition model.

6. The method as described in claim 1, wherein the sensitive samples and the non-sensitive samples are sentences included in the corpus of text.

7. The method as described in claim 1, wherein the sensitive samples and the non-sensitive samples are paragraphs included in the corpus of text.

8. A method comprising:
forming, by a processing device, client-content adjacent databases that include a client database and a sensitive contents database, the client-content adjacent databases differing in that a client and a sensitive entity are present a corresponding database of the client-content adjacent databases and are not present in another database of the client-content adjacent databases, the forming including:
removing samples associated with a client of a plurality of clients from the respective database of the client-content adjacent databases; and
removing sensitive samples associated with a particular instance of sensitive content of a plurality of sensitive content regardless of client association from the respective database of the client-content adjacent databases;
identifying, by the processing device, a set of clients from the plurality of clients from the client-content adjacent databases;
identifying, by the processing device, a set of sensitive samples from the plurality of sensitive content from the client-content adjacent databases;
generating training data by applying one or more differential privacy techniques to the samples associated with the set of clients or the set of sensitive samples; and
training a machine learning model using the training data by a loss function using an aggregated gradient that is aggregated across the plurality of clients and the plurality of sensitive content, the training including injecting Gaussian noise and updating parameters of the machine learning model.

9. The method as described in claim 8, wherein the sensitive samples and the samples are determined by processing a corpus of text using an additional machine learning model.

10. The method as described in claim 9, wherein the samples include a respective said sensitive sample based on an error rate associated with the additional machine learning model.

11. The method as described in claim 9, wherein the additional machine learning model includes a named entity recognition model.

12. The method as described in claim 8, wherein the machine learning model includes at least one of a Long Short Term Memory model, a Bidirectional Encoder Representations from Transformers model, or a Generative Pretrained Transformer 2 model.

13. The method as described in claim 8, wherein the sensitive samples and the samples are sentences or paragraph included in a corpus of text.

14. A computing device comprising:
a processing device; and
a computer-readable storage medium storing instructions that, responsive to execution by the processing device, causes the processing device to perform operations including:
forming client-content adjacent databases that include a client database and a sensitive contents database, the client-content adjacent databases differing in that a client and a sensitive entity are present a corresponding database of the client-content adjacent databases and are not present in another database of the client-content adjacent databases, the forming including:
removing samples associated with a client of a plurality of clients from the respective database of the client-content adjacent databases; and
removing sensitive samples associated with a particular instance of sensitive content of a plurality of sensitive content regardless of client association from the respective database of the client-content adjacent databases;
identifying a set of clients from the plurality of clients from the client-content adjacent databases;
identifying a set of sensitive samples from the plurality of sensitive content from the client-content adjacent databases;
generating training data by applying one or more differential privacy techniques to the samples associated with the set of clients or the set of sensitive samples; and
training a machine learning model using the training data by a loss function using an aggregated gradient that is aggregated across the plurality of clients and the plurality of sensitive content, the training including injecting Gaussian noise and updating parameters of the machine learning model.

15. The computing device as described in claim 14, wherein the sensitive samples and the samples are determined by processing a corpus of text using an additional machine learning model.

16. The computing device as described in claim 15, wherein the samples include a respective said sensitive sample based on an error rate associated with the additional machine learning model.

17. The computing device as described in claim 15, wherein the additional machine learning model includes a named entity recognition model.

18. The computing device as described in claim 14, wherein the machine learning model includes at least one of a Long Short Term Memory model, a Bidirectional Encoder Representations from Transformers model, or a Generative Pretrained Transformer 2 model.

19. The computing device as described in claim 14, wherein the sensitive samples and the samples are sentences or paragraph included in a corpus of text.

\* \* \* \* \*